Sept. 5, 1939.  C. K. BASSETT  2,171,620

FLOAT VALVE DEVICE FOR USE IN METERING LIQUIDS

Filed March 12, 1938

INVENTOR Charles F. Bassett

Patented Sept. 5, 1939

2,171,620

UNITED STATES PATENT OFFICE 2,171,620

FLOAT VALVE DEVICE FOR USE IN METERING LIQUIDS

Charles K. Bassett, Buffalo, N. Y.

Application March 12, 1938, Serial No. 195,564

3 Claims. (Cl. 137—68)

My invention relates to a float valve device for use in metering liquids which are flowing at such a low rate that they cannot be ordinarily metered by simple and inexpensive mechanical means, such as the displacement type liquid meters which are now commercially available. Among the best of such meters is the familiar nutating disc type liquid meter which, if carefully constructed, will accurately measure flows of liquids, such as fuel oil, at flows having a rate as low as three gallons per hour or as high as twenty gallons per minute.

The object of my invention particularly is to measure flows of liquid which must be discharged from the measuring device slowly and uniformly at flow rates which will ordinarily be between one-half and two and one-half gallons per hour. Such flows do not develop enough power to continuously overcome the running friction of displacement type liquid meters. This friction loss, however, can be minimized if only operative during a part of the flow cycle. A particular application of my device is to the measurement of fuel oil consumed by small oil burners used especially for house heating purposes. The supply of oil to the oil burner when burning must be steady and constant and is usually at a flow of approximately two gallons per hour. My device is especially suited for the metering of such slow flowing liquid, but its maximum capacity is substantially that of the liquid meter which is used as a part of the device, as shown in the illustrations and description.

Another object of my invention is to construct such a device in an inexpensive manner. This is done by using a standard displacement type liquid meter that is produced in large quantities at a low cost and which is entirely suitable for measuring flows of fuel oil at about one gallon per minute. This meter is installed to measure the intermittent flow into a small storage reservoir, from which there is a steady flow at a much lower rate to the point where combustion is occurring. My invention allows this storage reservoir to be constructed of standard low cost parts, such as are used in vacuum type gasoline feed systems, which have been made in large numbers for many years for use on automobile gasoline lines. My storage reservoir has been so designed in my invention that only four special parts are required, while all of the remaining parts are standard parts of the previously mentioned vacuum tank or feed system. I have inverted these standard parts from their usual position, and with the essential addition of a substantial base I have provided for an assembled storage reservoir which can be installed in an ordinary fuel oil pipe line and which will be substantial enough to withstand the strains of assembling such piping. The original vacuum tank, which is assembled in a small copper tubing line, could not be used successfully in a larger fuel oil line as the member having the inlet opening is not rugged enough, whereas my invention provides for a means whereby the strain between the inlet and outlet piping is not communicated to the sensitive and more fragile part of the storage reservoir. As shown in the drawing, the storage reservoir base is so constructed that no strain whatsoever is transmitted to the much lighter parts, which are purchased at a low price because of their high production as parts of a vacuum tank for which high production tools and dies are already in existence.

Another object of my invention is to connect the float chamber space to the outer compartment of the storage reservoir by means of simple punched openings in the thin side wall of the shell, to allow the interflow of liquid through these openings as is necessary for the operation of the storage reservoir. Because the float chamber shell is now in an inverted position as compared with its original position in the vacuum tank, such new openings become necessary to allow ingress and egress of the liquid. The upper end of the float chamber shell is not altered in any way as it would be more difficult to make openings in this heavier piece. The upper end of this shell may be closed with a cap, as shown, to protect the float from injury. The lower set of these openings allows the flow of liquid from the float chamber into the outer compartment of the storage reservoir, when the float chamber is being filled with liquid. At the same time the upper set of openings allows the escape of air from the float chamber into the upper part of the reservoir, as is necessary to allow the entrance of liquid into the float chamber. At the end of the filling cycle these air openings may be below the level of the liquid, which would cause the air pressure within the float chamber shell to become slightly higher than atmospheric, but this would not prevent the float chamber from filling with liquid to the point at which the float reaches its uppermost limit of travel. It is not at all necessary to have the float chamber under atmospheric pressure at all times but, as in the vacuum type gasoline feed system, the float chamber during part of its cycle of operations is under a pressure slightly different from atmospheric pressure.

The construction which allows the use of a vacuum tank float chamber shell with minor alterations is a distinctive feature of my invention and distinctly novel from prior constructions used in storage reservoirs of this general type.

Another object of my invention is to allow the weight of the float itself to exert a direct and positive pressure on the inlet valve in addition to the pressure which is exerted by the spring in the snap action mechanism. In this way an increased pressure is available to open the inlet valve against the pressure head of the liquid in the inlet line leading to the storage reservoir, which in some installations might be too great for the spring itself to overcome.

To illustrate more clearly the application of my invention I shall describe its particular use in connection with small oil burners.

Figures 1, 2:
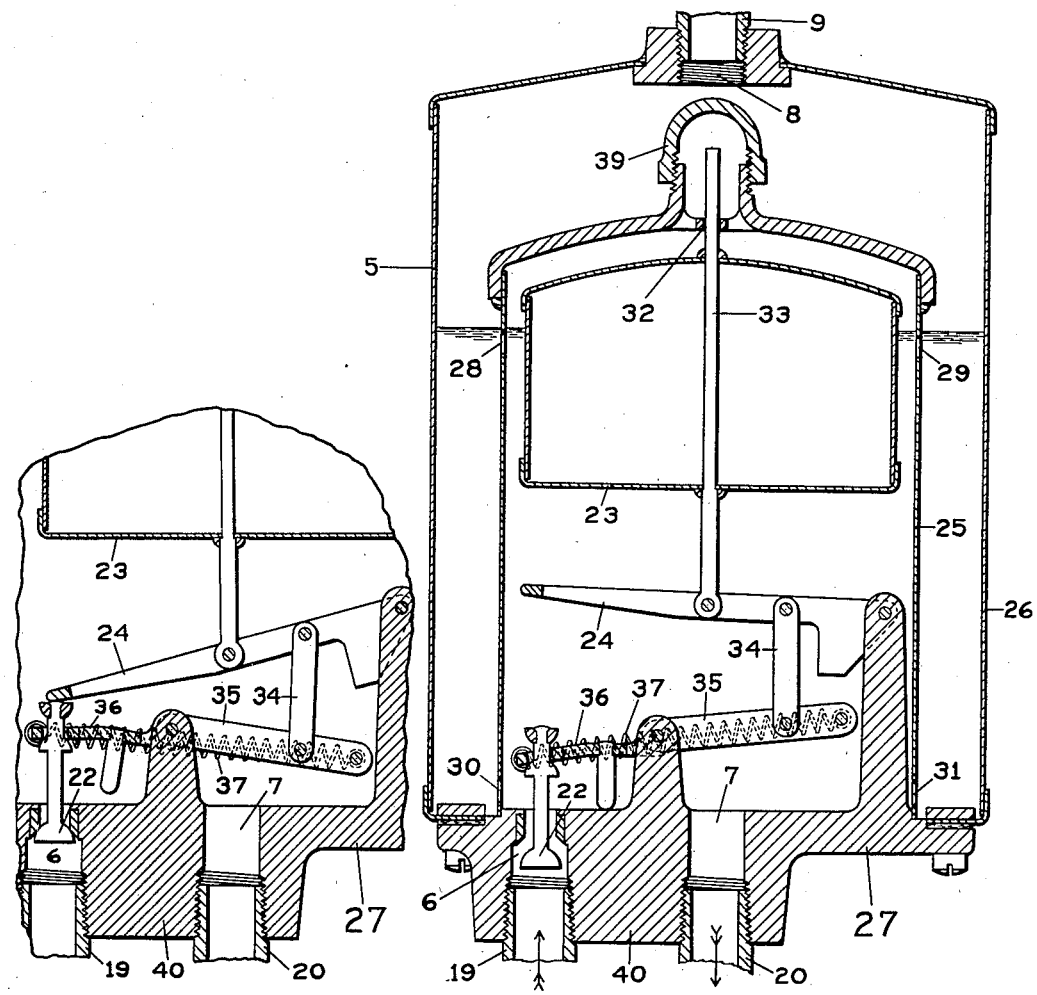
Figure 1 is a vertical sectional view through the storage reservoir and shows the location of the openings and interior mechanism when the level of the liquid within the reservoir is near its uppermost limit and the inlet valve is about to close.
Figure 2 is a vertical sectional view through the lower part of the storage reservoir and shows the position of the interior mechanism when the level of the liquid within the reservoir is near its lower limit and the inlet valve is about to open.

Referring to the drawing in detail, 1 is a tank serving as the oil supply container. 2 is a shut-off valve on the discharge line from supply container 1. 3 is a trap strainer of the usual type, which is desirable on such installations to remove impurities from the oil before it enters the other apparatus. 4 is any suitable liquid meter and is shown as the familiar displacement type nutating disc liquid meter. 5 is the storage reservoir with inlet 6, outlet 7 and vent opening 8. 9 is piping means leading from storage reservoir 5 to allow the egress and ingress of air through vent opening 8 as required for the successful operation of the storage reservoir mechanism. 10 is a support of conventional design for supply container 1. 11 is piping means acting as a vent from supply container 1 and as shown in the drawing, also acts as an extension of venting piping means 9 which joins it when piped, as shown in the drawing, to provide a free atmospheric vent for storage reservoir 5. 12 is the filling opening for supply container 1 and may be of any conventional design as shown. 13 is a fuel oil burner of the usual type, installed so as to heat furnace 14 which is shown of a house heating type. 15 is a shut-off valve on the outlet line from storage reservoir 5. 16, 17, 18, 19, 20 and 21 are piping means, connecting the previously mentioned units, all as indicated in the drawing.

Storage reservoir 5, as shown in Figure 1 and Figure 2, has in its outlet 6, valve 22 and also comprises float 23, which is operatively connected to valve 22 by a snap action toggle mechanism, which is shown of the standard type as used in automobile gasoline feed line vacuum tanks. This toggle mechanism consists essentially of float lever 24 together with connecting link 34, hinged independent lever arms 35 and 36, and spring 37, which is attached near the outermost ends of arms 35 and 36 and causes sudden snap movements of arm 36 upward and downward following similar movements of arm 35. Storage reservoir 5 has its interior space divided into two parts. Float chamber shell 25 encloses float 23 to form a distinct float chamber, while outer casing 26, together with float chamber shell 25 form an outer storage compartment between them. Storage reservoir base 27 closes off the lower end of the reservoir to complete the enclosure of the float chamber and the outer storage compartment. 28 and 29 are openings to allow the escape of air from the float chamber during the filling operation and to allow the entrance of air into the float chamber during the emptying operation. 30 and 31 are openings to allow the flow of liquid from the float chamber during the filling operation and to allow the entrance of liquid from the outer storage compartment into the float chamber during the emptying operation. These openings increase the effective capacity of the float chamber by adding the outer storage compartment capacity to it so as to increase the amount of liquid handled by the storage reservoir for each cycle of operations between successive openings of valve 22. This double wall construction for the storage reservoir prevents injury of the delicate float chamber shell from blows on the outside of the reservoir and prevents misalignment of the float with its connecting mechanisms. The use of an inner working chamber and outer protective casing has been found extremely desirable in liquid measuring devices of all kinds where the sensitive inner working mechanism would be put out of commission by an indentation or distortion that would not cause impairment of the device if sustained by the more rugged outer wall or casing.

Valve 22 as shown in the drawing, is wide open when float 23 is at its lower position with the level of the liquid within the float chamber at a low point. When the liquid level within the chamber reaches a higher point, as the chamber fills with liquid, float 23 moves upward and through the connecting toggle mechanism finally closes valve 22 with a sudden snap action to prevent throttling of the flow into the storage reservoir. Prevention of this throttling is necessary so that the rate of flow through meter 4 will be substantially the same throughout the cycle of operation of the storage reservoir between successive openings of valve 22.

Outlet 7 leads from the bottom of the float chamber within shell 25 and to it is attached piping means 20, which, together with piping means 19, in usual installations of the type shown is ½" size iron pipe. Storage reservoir 5 must be so constructed that it can become a self-supporting part of the pipe line. I have, therefore, provided in base 27 a section 40 of increased strength which acts as a connecting link between piping means 19 and 20 to prevent the transmittal of strain in the piping to any other part of storage reservoir 5. This novel construction makes it possible for the reservoir to be used in a much heavier pipe line than the original copper tubing line used in automobile feed lines. I can, therefore, use the inexpensive stock parts of a vacuum tank and assemble them with my special base to make a successful storage reservoir for use in measuring fuel oil in much heavier installations. As previously explained, I have inverted the position of all of the parts of the vacuum tank so that they work in a distinctly different manner than when originally used so that the mechanism into which they combine forms a distinctly different assembly.

Because of the increased viscosity of the fuel oil over gasoline, I have constructed valve 22 of larger area than the valve used in the gasoline vacuum tank and have so constructed the snap action mechanism, that float lever 24 hits the uppermost end of the stem of valve 22 at an instant when the valve is trying to open by means of the downward pressure exerted on it by arm 36 and spring 37. This additional opening force, because of the pressure of lever 24 on valve 22, is a distinctly new action as compared with the snap action in a vacuum tank when used in the inverted position, as obviously the weight of float 23 can act on valve 22 to open it only if the float is moving downward at the time of the valve opening, as is the case when the vacuum tank parts are inverted and used as in this novel storage reservoir.

Float chamber shell 25 has in it an opening 32 which serves as a guide means for float stem 33, the upper end of which is protected by a cap 39.

Figure 3:
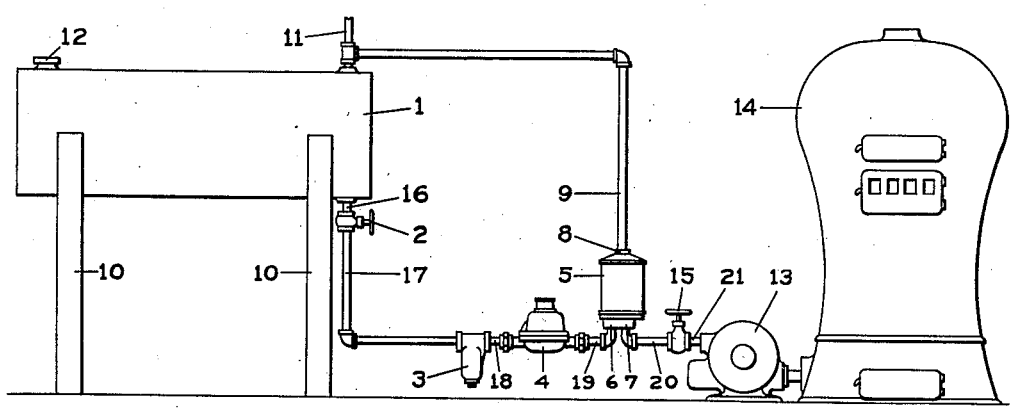
Figure 3 is an exterior side view of my metering device, as used to measure the fuel oil consumed by a fuel oil burner installed in a typical house heating furnace.

In passing one gallon of fuel oil through the installation, as shown in Figure 3, the meter is operated for approximately one minute only, but it would take approximately thirty minutes for this one gallon of oil to be used by the oil burner. In this way the friction of the meter must be overcome during only one-thirtieth of the time that the burner requires to use the oil so that the power available to operate the meter is thirty times that which it would be if the energy from the downward movement of the oil were distributed uniformly over the entire period of flow to the burner.

The essential elements of a measuring device with a storage reservoir are the storage reservoir on the outlet line from the meter between the meter and liquid consuming means, and a quick acting snap action valve controlling an intermittent flow to the reservoir and located between the meter and the float chamber of the reservoir, together with means to open said valve suddenly when the supply of liquid within said reservoir approaches its minimum, and to close said valve suddenly when the supply of liquid within said reservoir approaches its maximum. My invention, however, does not cover the basic principle of the combination of a meter and a reservoir, but covers improvements in the details of the reservoir to perfect its action, to reduce its cost by the use of standard inexpensive parts produced in large quantities for other purposes, and to allow its successful installation and use.

Having thus described my invention what I claim for Letters Patent is:

1. A gulper type storage reservoir for use in a liquid feed pipe line disposed between a source of liquid supply and a point of discharge, said reservoir including an outer casing having a side wall, a top wall and a bottom wall, a float chamber in said casing including a side wall in spaced relation to said casing side wall and connected to and closed at its lower end by said bottom wall, a head closing the upper end of said chamber and which is disposed in spaced relation to said casing top wall, an inlet port and an outlet port in said bottom wall in communication with said float chamber for connection to the pipe from said supply source and to the pipe leading to said point of discharge respectively, a valve controlling said inlet port, a float in said float chamber, means operable by said float for actuating said valve to close and open said inlet port in accordance with the rise and fall of the liquid between its upper and lower levels in said reservoir, said chamber side wall having an opening at the lower end thereof for the passage of liquid from said float chamber into the space between said chamber wall and said casing to increase the capacity of said reservoir beyond that of said float chamber, said casing having an air vent in the upper part thereof, said float chamber side wall also having an air vent in the upper part thereof at a distance below said chamber head for venting air from said float chamber to said casing vent as the level of liquid rises in said chamber, and said float chamber vent being positioned so as to be immersed in the rising liquid in said reservoir as the liquid approaches its upper level, and whereby the remaining air in said float chamber is trapped between the liquid therein and said chamber head and placed under pressure to form a cushion for said float between said float and said head as the upper level of the liquid is reached.

2. A gulper type storage reservoir for use in a liquid feed pipe line disposed between a source of liquid supply and a point of discharge, said reservoir including a float chamber having a side wall closed at its upper end by a head, a bottom wall connected to and closing the lower end of said side wall and having therein an inlet port and an outlet port in communication with said float chamber for connection to the pipe from said supply source and to the pipe leading to said point of discharge respectively, a float in said chamber, a valve in said inlet port operatively connected to said float to close and open said port in accordance with the rise and fall of the liquid between its upper and lower levels in said reservoir, a casing disposed in spaced relation to and around the sides and top of said float chamber to form protecting means for said float chamber, said casing having a side wall closed by a top wall, said side wall having its lower end secured to and closed by said beforementioned bottom wall, said float chamber having an aperture therein for the passage of liquid from said chamber into the space between said chamber wall and said casing to increase the capacity of said reservoir beyond that of said float chamber, an air vent in said float chamber for venting air from said chamber, and a vent pipe secured in said top wall of said casing in communication with said space between said float chamber and said casing and the opening of which is directly over the top wall of said float chamber, whereby fluid entering said reservoir from said pipe will discharge upon said float chamber top wall and be deflected from said float so that the displacement of the latter with respect to the other elements of said reservoir will remain unchanged.

3. A gulper type storage reservoir for use in a liquid feed pipe line disposed between a source of liquid supply and a point of discharge, said reservoir including a float chamber having a side wall closed at its upper end by a head, a bottom wall connected to and closing the lower end of said side wall and having therein an inlet port and an outlet port in communication with said float chamber for connection to the pipe from said supply source and to the pipe leading to said point of discharge respectively, a float in said chamber, a valve in said inlet port for closing and opening said port in accordance with the rise and fall of the liquid in said chamber between predetermined upper and lower levels, and means in said chamber operable by said float for actuating said valve, said means including a simple lever pivoted at one end beneath said float, a part fixed to and depending from said float and pivoted to said lever between its ends, a pair of oppositely extending simple levers mounted upon a common pivot and one of which is operatively connected by a link to said first lever and the other of which has its free end swivelled to an upright stem secured to said valve and which projects into said float chamber, a tension spring extending between and connected to the free ends of said pair of levers and acting as a snap device to quickly throw said pair of levers to positions to shift said valve into said open and closed positions as said levers pass dead center in one direction or the other in accordance with the movement of said float between said upper and lower predetermined positions, and said first lever having its free end disposed directly over the upper end of said valve stem in position to positively engage and move said stem to open said valve by the movement of said lever upon its pivot upon and by descent of said float into its lower positon, in the event of failure of any other part of said snap mechanism.

CHARLES K. BASSETT.